(12) United States Patent
Nishikata et al.

(10) Patent No.: US 11,225,310 B2
(45) Date of Patent: Jan. 18, 2022

(54) UNDERWATER ACOUSTIC DECEPTION SYSTEM AND UNDERWATER ACOUSTIC DECEPTION METHOD

(71) Applicant: MITSUBISHI HEAVY INDUSTRIES, LTD., Tokyo (JP)

(72) Inventors: Shingo Nishikata, Tokyo (JP); Koichi Hamamoto, Tokyo (JP); Atsushi Ochiai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 16/638,572

(22) PCT Filed: Oct. 1, 2018

(86) PCT No.: PCT/JP2018/036692
§ 371 (c)(1),
(2) Date: Feb. 12, 2020

(87) PCT Pub. No.: WO2019/159422
PCT Pub. Date: Aug. 22, 2019

(65) Prior Publication Data
US 2021/0147050 A1    May 20, 2021

(30) Foreign Application Priority Data
Feb. 14, 2018  (JP) ............... JP2018-023980

(51) Int. Cl.
*B63G 9/02*   (2006.01)
*F41G 7/22*   (2006.01)
(Continued)

(52) U.S. Cl.
CPC ............... *B63G 9/02* (2013.01); *F41G 7/224* (2013.01); *G01S 7/537* (2013.01); *G10K 15/046* (2013.01)

(58) Field of Classification Search
CPC .. H01S 3/00; H01S 3/11; G02B 27/09; G63G 9/02; G41G 7/224; G01S 7/537; G01K 15/046; B63G 9/02; F41G 7/224
See application file for complete search history.

(56) References Cited

U.S. PATENT DOCUMENTS

| 2003/0127558 A1 | 7/2003 | Heizmann-Bartels |
| 2006/0096802 A1* | 5/2006 | Jones ............... G10K 15/046 |
| | | 181/142 |

(Continued)

FOREIGN PATENT DOCUMENTS

| EP | 3 489 616 | 5/2019 |
| JP | 1-305389 | 12/1989 |

(Continued)

OTHER PUBLICATIONS

International Search Report dated Dec. 18, 2018 in International (PCT) Application No. PCT/JP2018/036692.
(Continued)

*Primary Examiner* — Luke D Ratcliffe
(74) *Attorney, Agent, or Firm* — Wenderoth, Lind & Ponack, L.L.P

(57) ABSTRACT

An underwater acoustic deception system deceives a sensor installed on a threat existing in or on water by acoustic effect in order to protect ships from the threat. The underwater acoustic deception system is provided with a control device, a laser oscillator and emission optical system. The control device determines a focusing position to focus a laser beam (50) in water in order to generate bubbles (70) at a desired position with a desired scale and emission parameters of the laser beam (50). The laser oscillator generates the laser beam (50) configured to focus in water and generate bubbles. The emission optical system emits the generated laser beam (50) to the focusing position. The underwater acoustic deception
(Continued)

system deceives an arbitrary sensor existing in the water by acoustic effect of the bubbles (70) on the surroundings.

15 Claims, 15 Drawing Sheets

(51) Int. Cl.
    *G01S 7/537*    (2006.01)
    *G10K 15/04*    (2006.01)

(56) References Cited

U.S. PATENT DOCUMENTS

| | | | |
|---|---|---|---|
| 2011/0036991 A1 | 2/2011 | Oshemkov et al. | |
| 2015/0146338 A1* | 5/2015 | Jones | G02B 27/0955 361/231 |
| 2017/0343652 A1* | 11/2017 | de Mersseman | G01S 17/58 |

FOREIGN PATENT DOCUMENTS

| | | |
|---|---|---|
| JP | 90-18183 | 10/1990 |
| JP | 6-201819 | 7/1994 |
| JP | 2001-221846 | 8/2001 |
| JP | 2011-516914 | 5/2011 |
| JP | 2015-141090 | 8/2015 |
| KR | 10-2009-0105312 | 10/2009 |

OTHER PUBLICATIONS

International Preliminary Report on Patentability dated Aug. 27, 2020 in International (PCT) Patent Application No. PCT/JP2018/036692.

Notice of Reasons for Refusal dated Nov. 4, 2020 in counterpart Japanese Patent Application No. 2020-500263, with Machine Translation.

Extended European Search Report dated Jul. 13, 2020 in corresponding European Patent Application No. 18906538.6.

\* cited by examiner

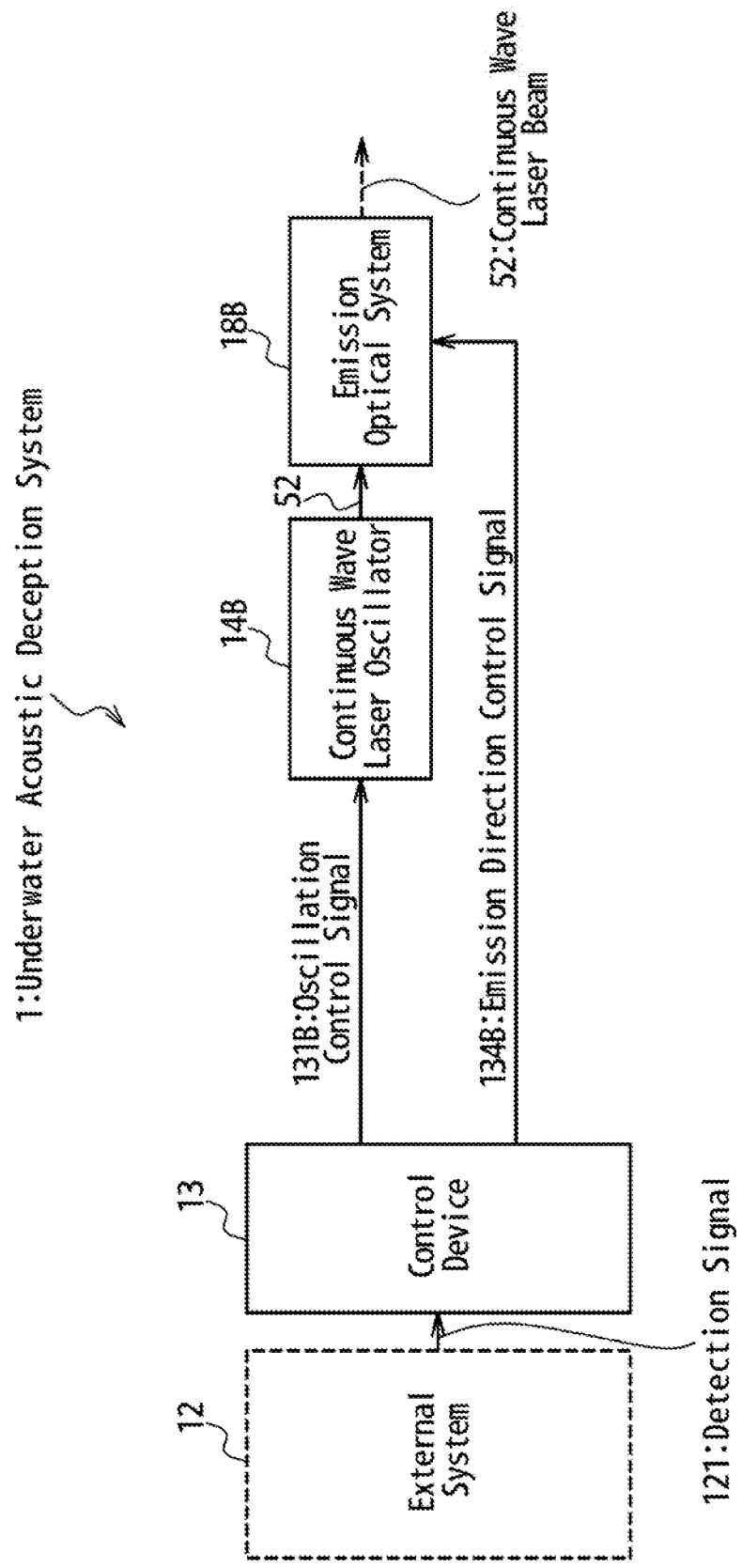
F I G. 5

UNDERWATER ACOUSTIC DECEPTION SYSTEM AND UNDERWATER ACOUSTIC DECEPTION METHOD

TECHNICAL FIELD

The present invention relates to an underwater acoustic deception system and an underwater acoustic deception method and, for example, is suitable for use in an underwater acoustic deception system and an underwater acoustic deception method that use laser beam.

BACKGROUND ART

Submarines are big threats for modern surface ships. Submarines take important role in modern warfare.

Submarines and torpedoes that are main attack means thereof detect objectives, surrounding objects, topography and the like by sonars using sound waves. It may be cited as the reason that in water, attenuation rate of radio waves and light is high and that propagation thereof is difficult over long distances.

Such sonars are roughly classified into active sonars and passive sonars. Active sonar emits a sound wave called pinger itself and observes reverberation thereof. Passive sonar collects ambient sound waves without emitting sound waves such as pinger.

As a countermeasure against submarines, torpedoes or the like that use sonars, a method of using decoys that emit sound waves to deceive sonars is known. Such decoys are roughly classified into a towed decoy that can be moved by being towed by a transportation means such as another ship, a premise decoy that is supposed not to move after installation, a self-propelled decoy that has a means of transportation by its own, or the like. Each of these decoys has restrictions on installable places, operation time and the like and therefore it is difficult to continue deceiving sonars anywhere and anytime.

In addition, there are naval mines as threat for surface ships and submarines. A naval mine is a detonation installed in the water, on the surface of the water, on the sea floor or the like, and explodes and causes damage when any object comes in contact therewith or approaches within a predetermined distance.

As naval mine detonating methods, for example, a method of detonating by detecting sound emitted from a target, a water pressure detection method of detonating by detecting a change of surrounding water pressure as a target approaches, and the like are known. Otherwise, there are also methods such as a contact method of detonating by detecting a physical contact with the target, a magnetic method of detonating by detecting a change of ambient magnetic as a target approaches, and the like.

Work of removing installed naval mines is called minesweeping. Minesweeping work is carried out in such a way that ships or the like tow minesweeping equipments. Therefore, naval mines that can be removed are the ones located behind the ships carrying out the minesweeping. For this reason, there is a possibility that a ship detonates a forward naval mine due to its own navigation and is damaged.

In connection with the above, the patent literature 1 (US Patent Publication No. 2003/0127558) discloses a system to use for a detection of a threat and underwater object by laser beam and for an underwater vehicle to countermeasure this detection. This system is provided with a laser beam detection means, a laser beam warning receiver and a signal processor. Here, the laser beam detection means is configured to be arranged on a surface of the underwater vehicle and to detect laser beam. The laser beam warning receiver and the signal processor are connected to the laser beam detection means and control the laser beam detection means.

In the case of the system of the patent literature 1, in order to treat an underwater threat, a laser beam is emitted toward the threat itself. However, an ordinary laser beam is greatly attenuated in water. Therefore, it is difficult to directly emit a laser beam toward an underwater torpedo and destroy it such as in the patent literature 1.

In addition, the invention of prior application (Japanese Patent Publication No. 2016-218229 A1) by the inventors of the present invention discloses an underwater object destroying system. This underwater object destroying system is provided with a detection device, a laser oscillator, an emission optical system and a control device. Here, the detection device detects underwater target object. The laser oscillator generates a laser beam configured to focus in the water and generate bubbles or plasma. The emission optical system emits the generated laser beam to a predetermined focusing position. The control device controls the laser oscillator and the emission optical system so as to generate bubbles or plasma in a vicinity of the detected target object. The underwater object destroying system of the prior application destroys the target object by impact due to bubbles or plasma.

The underwater object destroying system of the prior application aims to destroy a target by an impact occurred by generating bubbles or the like in the water by laser in order to generate bubbles or the like. Therefore, it is necessary to focus the laser at a position deeper than the target. In addition, it is necessary to emit a relatively strong laser beam.

CITATION LIST

Patent Literatures

[Patent Literature 1] US Patent Publication No. 2003/0127558 A1

SUMMARY OF INVENTION

Deceiving sensors installed to a threat by acoustic effect in order to protect ships that are protection target from the threat existing in the water or on the surface of the water. Other problems and novel features will be apparent from the description of the specification and accompanying drawings.

According to an embodiment, an underwater acoustic deception system is provided with a control device, a laser oscillator and an emission optical system. Here, the control device determines a focusing position to focus a laser beam in water in order to generate bubbles at a desired position with a desired scale and emission parameters of the laser beam. The laser oscillator generates the laser beam configured to focus in water and generate bubbles, under control of the control device. The emission optical system emits, under control of the control device, the generated laser beam toward the focusing position. The underwater acoustic deception system deceives an arbitrary sensor existing in the water by acoustic effect of the bubbles on the surroundings.

According to an embodiment, an underwater acoustic deception method includes determining a focusing position to focus a laser beam in water in order to generate bubbles at a desired position with a desired scale and emission parameters of the laser beam, generating the laser beam configured to focus in the water and generate the bubbles, emitting the generated laser beam to the focusing position, and deceiving an arbitrary sensor existing in the water by acoustic effect of the bubbles on the surroundings.

According to an embodiment, a sensor existing in water can be deceived by acoustic effect obtained by generating bubbles in water by laser beam.

BRIEF DESCRIPTION OF DRAWINGS

FIG. 5 is a block circuit diagram showing an example of configuration of an underwater acoustic deception system according to a second embodiment.

DESCRIPTION OF EMBODIMENTS

Embodiments for carrying out an underwater acoustic deception system and an underwater acoustic deception method according to the present invention will be described in the following with reference to attached drawings.

First Embodiment

At first, examples of operation of submarines and torpedoes provided with various types of sonars will be described with reference to FIGS. 1A, 1B and 2. Various types of sonars correspond to sensors that are targets to deceive.

Figure 1A:
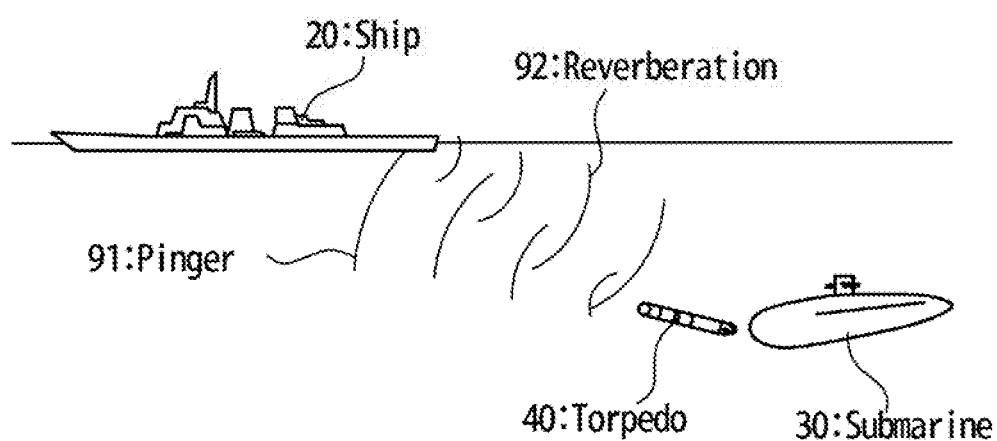
FIG. 1A is a diagram for describing an example of operation of active sonar.

FIG. 1A is a diagram for describing an example of operation of active sonar. In the example of operation in FIG. 1A, a ship 20 navigating on water, a submarine 30 navigating in water and a torpedo 40 fired from the submarine 30 are present. The active sonar installed in the torpedo 40 emits a pinger 91. When the emitted pinger 91 reaches the ship 20, at least a part thereof is reflected as a reverberation 92. When the reverberation 92 reaches the active sonar, the torpedo 40 can obtain a direction and a distance to the ship 20. As a result, the torpedo 40 can move toward the ship 20.

Figure 1B:
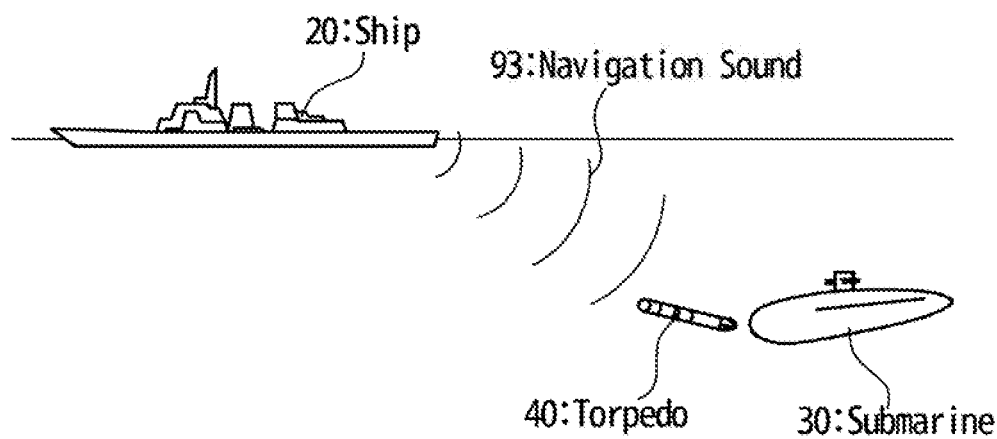
FIG. 1B is a diagram for describing an example of operation of passive sonar.

FIG. 1B is a diagram for describing an example of operation of passive sonar. In the example of operation in FIG. 1B, a ship 20 navigating on water, a submarine 30 navigating in water and a torpedo 40 fired from the submarine 30 are present. The passive sonar installed in the torpedo 40 is different from the active sonar in FIG. 1A and emits no pinger 91. Therefore, the passive sonar receives no reverberation 92 generated by a reflection of a pinger 91. Alternatively, passive sonar collects sound waves in the surroundings. In the example of FIG. 1B, the torpedo 40 can obtain a direction and a distance to the ship 20 by reception by the passive sonar of a navigation sound 93 emitted by the ship 20. As a result, the torpedo 40 can move toward the ship 20.

It should be noted that, although cases where the torpedo 40 is provided with sonar are described in the examples of FIGS. 1A and 1B, the submarine 30 may be provided with sonar. In this case, the submarine 30 may obtain a direction and a distance to the ship 20 and then fire the torpedo 40 so that it navigates toward the ship 20. In addition, the fired torpedo 40 then may move by obtaining the direction and the distance to the ship 20 by its own sonar.

Figure 2:
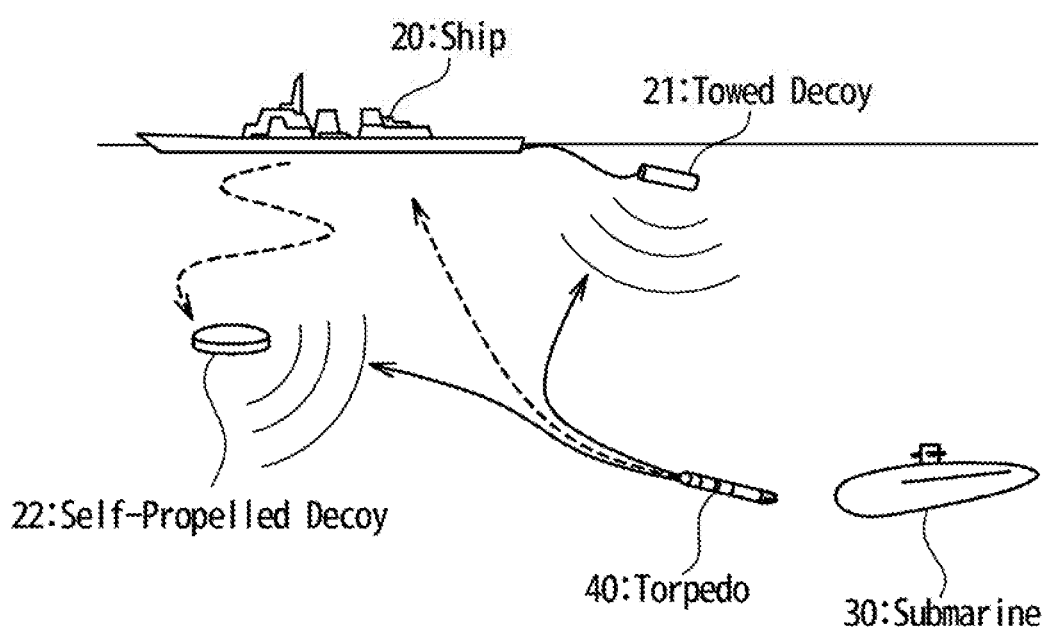
FIG. 2 is a diagram showing an example of a method of deceiving sonar by acoustic effect.

FIG. 2 is a diagram showing an example of a method of deceiving sonar by acoustic effect. There is a case in which the ship 20 deceives the sonar of the torpedo 40 in order not to be attacked by the torpedo 40. As a detailed method of deceiving sonar, a decoy that emits sound waves may be used. As decoys, towed decoy 21 that moves towed by the ship 20 or the like, a self-propelled decoy 22 that moves independently to the ship 20, and the like are known. In any case, by making the torpedo 40 recognize the towed decoy 21 or self-propelled decoy 22 as the ship 20, a possibility in that the torpedo 40 reaches the ship 20 can be lowered.

In this embodiment, instead of using a decoy, an underwater acoustic deception system with laser beam is used. The underwater acoustic deception system according to the present embodiment emits laser beam so as to focus in water. By doing so, bubbles are generated in a region where the laser beam is focused. Various types of acoustic effect generated by these bubbles are used for sonar deception.

Figure 3A:
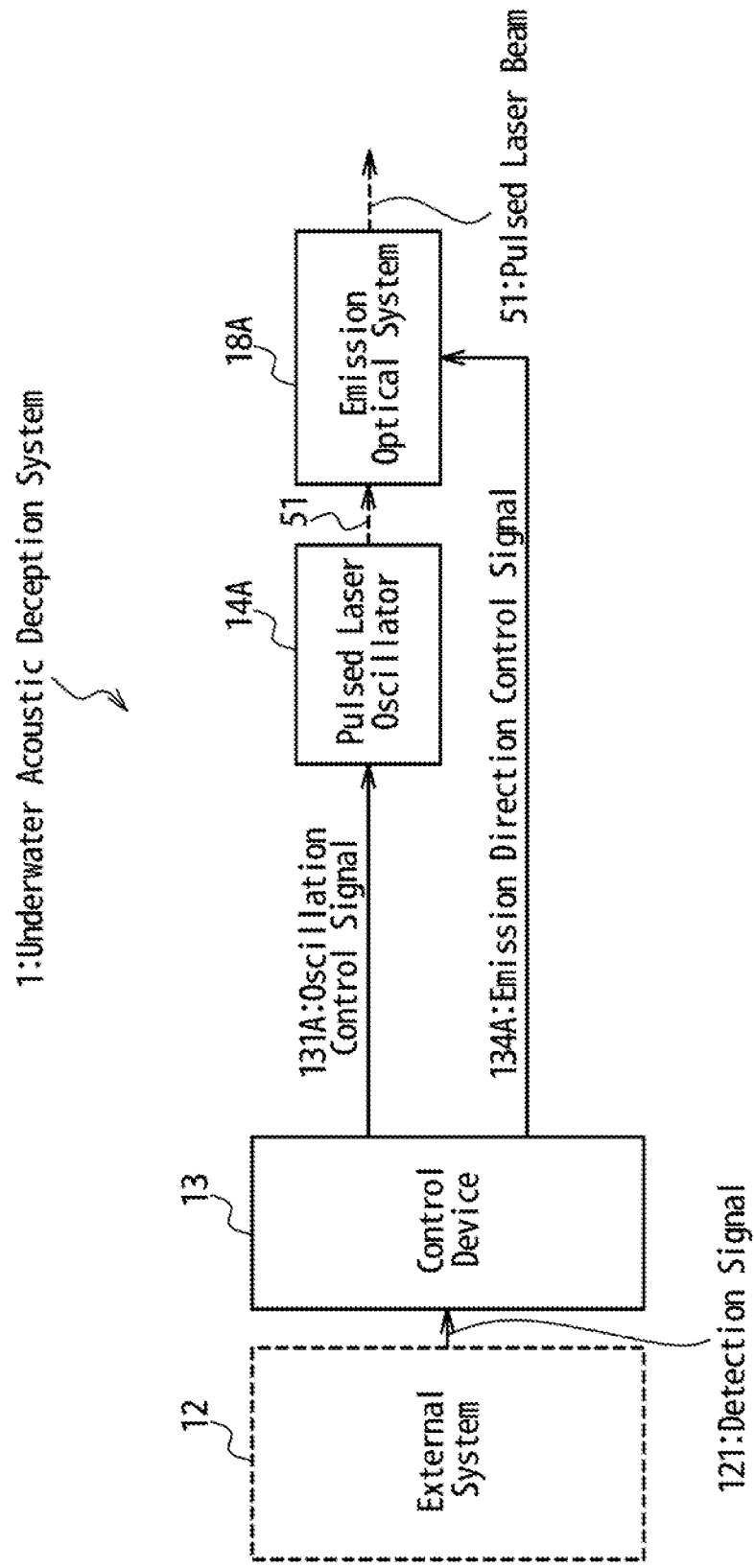
FIG. 3A is a block circuit diagram showing an example of configuration of an underwater acoustic deception system according to a first embodiment.

An example of configuration of an underwater acoustic deception system 1 according to the present embodiment will be described with reference to FIG. 3A. FIG. 3A is a block circuit diagram showing an example of configuration of the underwater acoustic deception system 1 according to the first embodiment.

Components of the underwater acoustic deception system 1 in FIG. 3A will be described. The underwater acoustic deception system 1 in FIG. 3A is provided with an external system 12, a control device 13, a pulsed laser oscillator 14A and an emission optical system 18A. The external system 12 is, for example, a detection system provided to the ship 20 and is preferably provided with sonar for detecting presence of objects in water such as submarine 30 or torpedo 40. The control device 13 may be a computer provided with an input/output interface that carries out transmission and reception of signals, a memory device that stores programs and data and a Central Processing Unit (CPU) that executes programs in the memory device and generates signals. The pulsed laser oscillator 14A preferably generates and output pulsed laser under control of the control device 13 and based on emission parameters determined by the control device 13. The emission optical system 18A is preferably provided with optical devices such as lenses, reflection mirrors and the like and driving devices that adjust positions of lenses, angles of reflection mirrors and the like, in order to adjust emission direction and focusing distance. The external system 12, the control device 13, the pulsed laser oscillator 14A and the emission optical system 18A may be provided to a ship 20 that is not shown all together, or a part thereof may be provided to the ship 20 and remaining part thereof to other places such as a decoy, an aircraft or the like.

Connection relationship between each component in FIG. 3A will be described. When paying attention to electrical connection relationship, the control device 13 is connected to output of the external system 12. The pulsed laser oscillator 14A and the emission optical system 18A are connected to output of the control device 13. Herein, electrical connection relationship may be realized by wired communication or wireless communication. When paying attention to optical connection relationship, the emission optical system 18A is connected to output of the pulsed laser oscillator 14A. It should be noted that it is needless to point out that the optical connection relationship may be mediated by appropriate use of optical components such as mirrors, lenses, beam splitters or the like that are not shown.

Figure 3B:
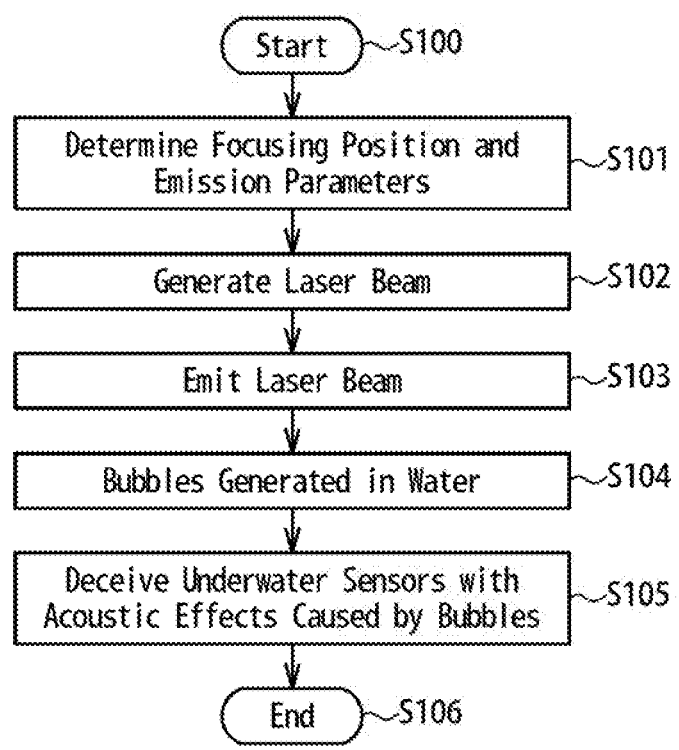
FIG. 3B is a flowchart showing an example of configuration of an underwater acoustic deception method according to a first embodiment.

An operation of the underwater acoustic deception system 1 in FIG. 3A, that is, the underwater acoustic deception method according to the present embodiment, will be described with reference to FIGS. 3B and 4A to 4D. FIG. 3B is a flowchart showing an example of configuration of the underwater acoustic deception method according to the first embodiment. The flowchart in FIG. 3B includes seven steps in total from the 0-th step S100 to the sixth step S106. The flowchart in FIG. 3B starts by the 0-th step S100. The first step S101 is executed next to the 0-th step S100.

In the first step S101, the control device 13 determines a focusing position that is a target position where a laser beam 50 is to be focused and emission parameters of the laser beam 50. Herein, as an example, following description will be carried out assuming a case in which the underwater acoustic deception system 1 is installed to the ship 20 as a protection target itself and an approximate position of a submarine 30 as threat is obtained by the external system 12 or the like.

More specifically, the external system 12 generates detection signal 121 that shows a result of detecting a position of a submarine 30 as a threat. The external system 12 transmits the generated detection signal 121 to the control device 13. The control device 13 receives the transmitted detection signal 121. The control signal 13 determines the focusing position and the emission parameters based on the received detection signal 121.

A method of determining a focusing position will be described. A focusing position corresponds to a position where bubbles 70 are generated by laser beam 50. It is expected that the generated bubbles 70 then rise by buoyancy and flow downstream by water current such as an ocean current. Thus, it is preferable to set the focusing position in lower direction, in upstream of an ocean current, or the like, from a position where bubbles 70 are desired to be generated. In addition, the position where the bubbles 70 are desired to be generated may be, for example, in a region between the ship 20 as a protection target and a submarine 30 as a potential threat thereof.

A method of determining emission parameters will be described. The pulsed laser oscillator 14A is able to instantaneously generate a relatively strong pulsed laser beam 51. Furthermore, the pulsed laser oscillator 14A is also able to intermittently generate pulsed laser beams 51 at a certain short interval, continuously in other words. Intensity of pulsed laser beam 51 generated at once affects sizes of bubbles 70 generated in water by this pulsed laser beam 51. In addition, when continuously generating pulsed laser beams 51, time intervals thereof affects total number and density of the bubbles 70 generated in water. The total number and the density of the bubbles 70 existing in a specific region will be called "scale of bubbles 70" in this region. Effects to the scale of bubbles 70 by these emission parameters (intensity of pulsed laser beam 51, time intervals or the like) change by underwater environment, that is, water temperature, water pressure and the like, too. Thus, it is preferable to store in the storage device of the control device 13 a table that records results of calculations in advance about what kind of emission parameters should be determined in accordance with a scale of bubbles 70 desired to generate and underwater environment, based on preliminary experimental data. Alternatively, a program that shows a method to calculate what kind of emission parameters should be determined in accordance with a scale of bubbles 70 desired to generate and underwater environment may be stored in the storage device of the control device 13 and may be executed by the processing device of the control device 13 as needed. It should be noted that water temperature, water pressure and the like may be detected by the external system 12 for example.

The second step S102 is executed next to the first step S101.

In the second step S102, the underwater acoustic deception system 1 generates pulsed laser beam 51 based on the determined emission parameters.

Specifically, at first, the control device 13 generates oscillation control signal 131A for controlling oscillation of pulsed laser based on emission parameters determined in the first step S101. The control device 13 transmits the generated oscillation control signal 131A to the pulsed laser oscillator 14A. The pulsed laser oscillator 14A receives the transmitted oscillation control signal 131A.

Next, the pulsed laser oscillator 14A oscillates pulsed laser in accordance with the received oscillation control signal 131A and emits the generated pulsed laser beam 51. The third step S103 is executed next to the second step S102.

In the third step S103, the underwater acoustic deception system 1 emits laser beam 50 toward the determined focusing position.

Specifically, at first, the control device 13 generates, based on the focusing position determined in the first step S101, emission direction control signal 134A for controlling a direction of emitting pulsed laser beam 51 and a focusing distance of focusing the emitted pulsed laser beam 51. The control device 13 transmits the generated emission direction control signal 134A to the emission optical system 18A. The emission optical system 18A receives the transmitted emission direction control signal 134A.

Next, the emission optical system 18A adjusts a direction of emitting pulsed laser beam 51 based on the received emission direction control signal 134A and adjusts focusing distance of focusing the emitted pulsed laser beam 51. The emission optical system 18A receives the pulsed laser beam 51 emitted by the pulsed laser oscillator 14A and emits the received pulsed laser beam 51 to the adjusted direction and so as to focus at the adjusted focusing distance. It should be noted that the focusing distance may be a distance from an emission port of the emission optical system 18A that emits pulsed laser beam 51 to the focusing position, for example.

It should be noted that actually a control of the emission optical system 18A by the control device 13 is desirably executed before the pulsed laser oscillator 14A generates pulsed laser beam 51. For example, it is desirable that the emission optical system 18A adjusts the direction of emitting pulse laser beam 51 and focusing distance before generating the pulse laser beam 51. In this sense, the second step S102 and the third step S103 may be partially executed in parallel.

The fourth step S104 is executed next to the third step S103.

Figure 4A:
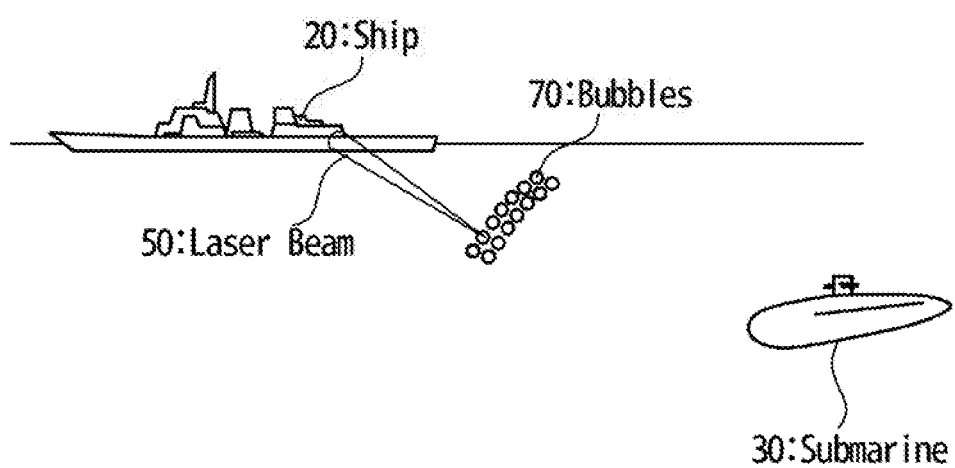
FIG. 4A is a diagram showing an example of state of an underwater acoustic deception system according to a first embodiment.

In the fourth step S104, bubbles 70 are generated in water by the emitted laser beam 50. More specifically, the emitted pulsed laser beam 51 focuses at the adjusted position. By the focused pulsed laser beam 51, surrounding water is brought to boil and bubbles 70 are generated. The underwater acoustic deception system 1 according to the present embodiment may be provided with a plurality of pulsed laser oscillators 14A for example. In this case, the underwater acoustic deception system 1 becomes able to emit a plurality of pulsed laser beams 51 at once and generate a plurality of groups of bubbles 70 at once by focusing at respectively different positions. Alternatively, a single pulsed laser oscillator 14A may intermittently emit pulsed laser beams 51 at short intervals and continuously generate a plurality of groups of bubbles 70 by focusing at different positions, respectively. By doing so, a plurality of groups of bubbles 70 may be generated in an arrangement such as a wall or a net. FIG. 4A is a diagram showing an example of a state of the underwater acoustic deception system 1 according to the first embodiment. The fifth step S105 will be executed next to the fourth step S104.

In the fifth step S105, a sensor in water, that is, sonar provided to a submarine 30 as a threat, is deceived by acoustic effect of bubbles 70 generated in water.

Figure 4B:
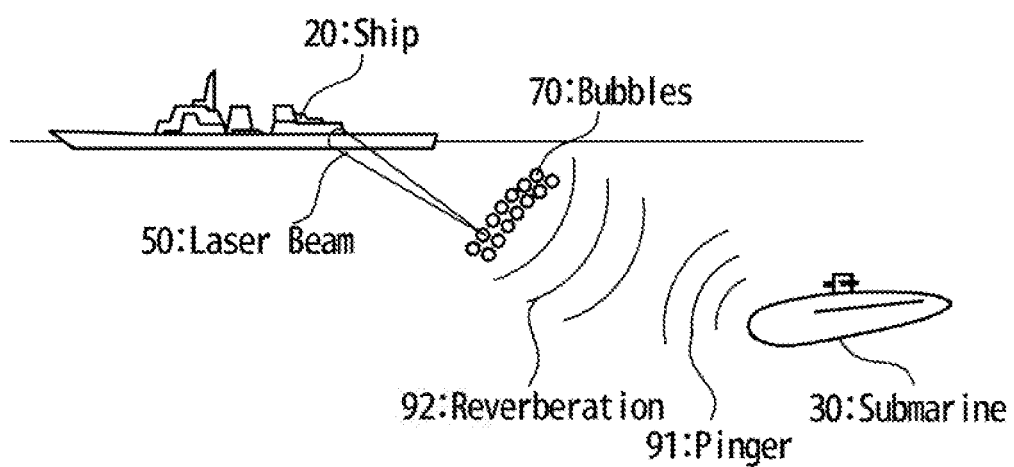
FIG. 4B is a diagram showing an example of state of an underwater acoustic deception system according to a first embodiment.

As an example, a case in which a submarine 30 is trying to detect a position of a ship 20 by use of active sonar will be described. FIG. 4B is a diagram showing an example of a state of the underwater acoustic deception system 1 according to the first embodiment. In the example in FIG. 4B, a pinger 91 emitted by the active sonar of the submarine 30 as a threat does not reach the ship 20 as a protection target but is reflected by bubbles 70 generated between the submarine 30 and the ship 20. The phenomenon in that the bubbles 70 reflects the pinger 91 that is a sound wave is a kind of acoustic effect that the bubbles 70 have. The active sonar of the submarine 30 as a threat receives a reverberation 92 generated by the reflection of the pinger 91 on the bubbles 70. As a result, it is expected that the active sonar of the submarine 30 as a threat misidentifies the region where the bubbles 70 are positioned as a position of the ship 20 as protection target.

Figure 4C:
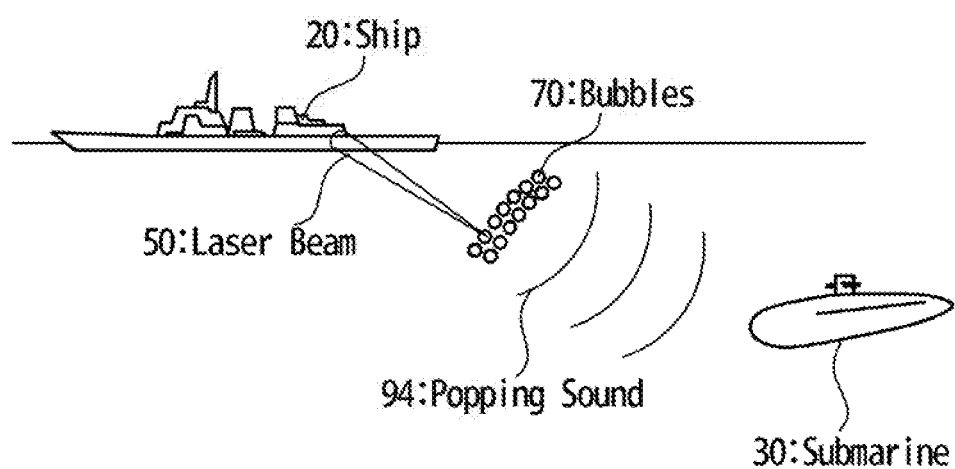
FIG. 4C is a diagram showing an example of state of an underwater acoustic deception system according to a first embodiment.

As another example, a case in which the submarine 30 is trying to detect the position of the ship 20 by use of passive sonar will be described. FIG. 4C is a diagram showing an example of a state of the underwater acoustic deception system 1 according to the first embodiment. Passive sonar emits no pinger 91, unlike active sonar. Therefore, no reverberation 92 is generated by bubbles 70 as in FIG. 4B. On the other hand, bubbles 70 in FIG. 4C generate a popping sound 94 when deforming or bursting in water or on a surface of water. Therefore, it is expected that the passive sonar of the submarine 30 as a threat receives this popping sound 94 and misidentifies the region where the bubbles 70 are positioned as the position of the ship 20 as protection target.

Figure 4D:
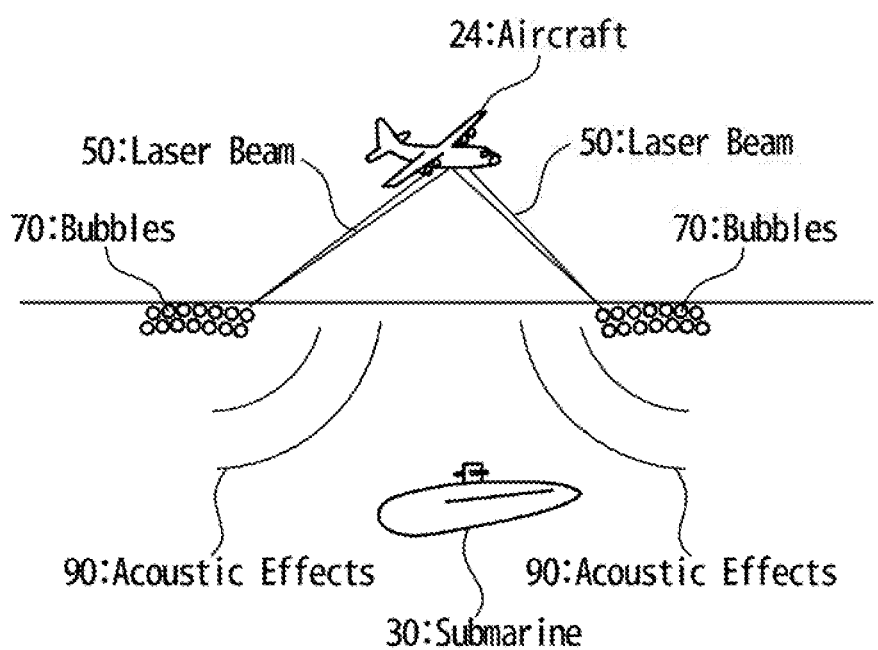
FIG. 4D is a diagram showing an example of state of an underwater acoustic deception system according to a first embodiment.

As an example of variation of the present embodiment, a case in which the underwater acoustic deception system 1 is installed not in the ship 20 but in an external aircraft 24 will be described. Compared to a ship 20, an aircraft 24 has a higher degree of freedom of movement and is less susceptible to attacks from a submarine 30 as a threat; furthermore, attenuation of laser beam 50 is less in case of propagation in the air than in case of propagation in the water. Therefore, an aircraft 24 is appropriate as a platform to install an underwater acoustic deception system 1. FIG. 4D is a diagram showing an example of a state of the underwater acoustic deception system 1 according to the first embodiment.

The sixth step S106 is executed next to the fifth step S105 and the flowchart in FIG. 3B ends.

As described above, according to the underwater acoustic deception system 1 and the underwater acoustic deception method of the present embodiment, it is possible to deceive sonars as sensors provided to underwater objects as a threat, such as submarines 30, torpedoes 40 and the like, and make them misidentify positions of ships 20 as protection target. It should be noted that since pulsed laser has a great instantaneous output power a time lag from emission thereof to generation of bubbles 70 can be suppressed to nanosecond order. In addition, since pulse laser has a small average outputting time an electric power required to deceive underwater sensors can be kept small.

Second Embodiment

An underwater acoustic deception system 1 with a configuration different from FIG. 3A will be described with reference to FIG. 5. FIG. 5 is a block circuit diagram showing an example of configuration of the underwater acoustic deception system 1 according to the second embodiment.

The underwater acoustic deception system 1 according to the present embodiment shown in FIG. 5 has following difference compared to the underwater acoustic deception system 1 according to the first embodiment shown in FIG. 3A. That is, in the present embodiment, continuous wave laser beam 52 is used instead of pulsed laser beam 51 used in the first embodiment.

Specifically, the pulsed laser oscillator 14A and the emission optical system 18A in the first embodiment are replaced with the continuous wave laser oscillator 14B and the emission optical system 18B shown in FIG. 5, respectively. Since other configuration of the underwater acoustic deception system 1 according to the present embodiment is similar to the first embodiment case, further specific description will be omitted.

In the following, in case of not distinguishing pulsed laser beam 51 and continuous wave laser beam 52, they may be simply called "laser beam 50". Similarly, in case of not distinguishing the pulsed laser oscillator 14A, the continuous wave laser oscillator 14B or the like, they may be simply called "laser oscillator 14". In addition, in case of not distinguishing emission optical systems 18A, 18B or the like, they may be simply called "emission optical system 18".

The continuous wave laser beam 52 used in the present embodiment can generate bubbles 70 by focusing in water, similarly to the pulsed laser beam 51 of the first embodiment. Furthermore, a continuous wave laser beam 52 can be emitted without interruption and therefore can continuously generate bubbles 70. Herein, the continuous wave laser 52 can generate a single long bubble 70 by moving focusing position while continuously generating.

A method of operation of the underwater acoustic deception system 1 according to the present embodiment, that is, an underwater acoustic deception method according to the present embodiment, is similar to the first embodiment case shown in the flowchart in FIG. 3B; therefore, further specific description will be omitted.

In general, instantaneous output power of a continuous wave laser beam 52 is lower, compared to pulsed laser beam 51. For this reason, a time lag on the order of tens to hundreds of milliseconds occurs from emission of continuous wave laser beam 52 to generation of bubbles 70. On the other hand, since continuous wave laser beam 52 is able to continuously generate bubbles 70, continuous wave laser beam 52 can expand bubbles 70 larger than bubbles 70 that can be generated by pulsed laser beam 51.

From a point of view of acoustic effect that bubbles 70 in water has, relatively small bubbles 70 generated by pulsed laser beam 51 reflect sound wave having relatively high frequency more effectively. In other words, relatively large bubbles 70 generated by continuous laser beam 52 reflect sound waves having relatively low frequency more effectively.

Third Embodiment

In the third embodiment, both advantages of the first embodiment and the second embodiment will be achieved by using pulsed laser beam 51 used in the first embodiment and continuous wave laser beam 52 used in the second embodiment together. Herein, pulsed laser beam 51 and continuous wave laser beam 52 may be emitted one by one by switching operation or both may be simultaneously emitted. Each example of configurations of the present embodiment will be described with reference to FIGS. 6 to 9.

(First Example of Configuration of the Third Embodiment)

Figure 6:
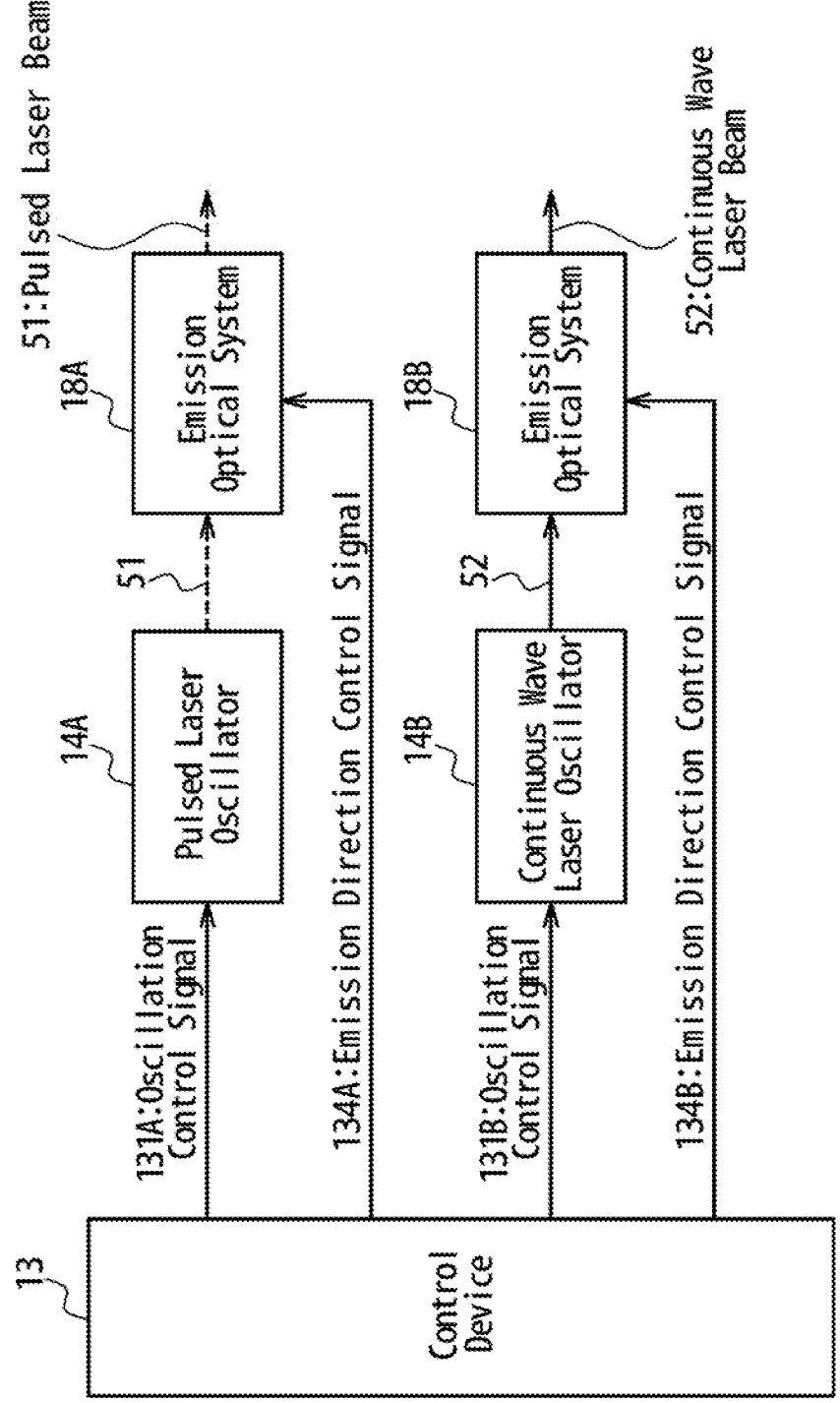
FIG. 6 is a block circuit diagram showing a first example of configuration of an underwater acoustic deception system according to a third embodiment.

In case of emitting pulsed laser beam 51 and continuous wave laser beam 52 one by one, as a first example of configuration of the underwater acoustic deception system 1 according to the present embodiment, the pulsed laser beam 51 and the continuous wave laser beam 52 may be oscillated by different oscillators, respectively, and emitted by different emission optical systems 18, respectively. FIG. 6 is a block circuit diagram showing a first example of configuration of the underwater acoustic deception system 1 according to the third embodiment. The underwater acoustic deception system 1 in FIG. 6 is provided with a control device 13, a pulsed laser oscillator 14A, a continuous wave laser oscillator 14B, an emission optical system 18A for pulsed laser and an emission optical system 18B for continuous wave laser.

The first example of configuration of the third embodiment shown in FIG. 6 has following difference compared to a case of the first embodiment shown in FIG. 3A. That is, the continuous wave laser oscillator 14B and the emission optical system 18B for continuous wave laser are added. In addition, the first example of configuration of the third embodiment shown in FIG. 6 has following difference compared to a case of the second embodiment shown in FIG. 5. That is, the pulses laser oscillator 14A and the emission optical system 18A for pulsed laser are added.

Configurations and connection relationships of the control device 13, the pulsed laser oscillator 14A and the emission optical system 18A for pulsed laser are similar to the case of the first embodiment and therefore further specific description thereof will be omitted. Configurations and connection relationships of the control device 13, the continuous wave laser oscillator 14B and the emission optical system 18B for continuous wave laser are similar to the case of the second embodiment and therefore further specific description thereof will be omitted. The control device 13 desirably generates and outputs an oscillation control signal 131A for controlling oscillation of pulsed laser beam 51 and an oscillation signal 131B for controlling oscillation of continuous wave laser beam 52 in response to detection signal 121 received from an external system 12 that is not shown, respectively at appropriate timing. Other operations of the underwater acoustic deception system 1 according to the first example of configuration of the present embodiment are similar to the case of the first embodiment or the second embodiment and therefore further specific description thereof will be omitted.

(Second Example of Configuration of the Third Embodiment)

Figure 7:
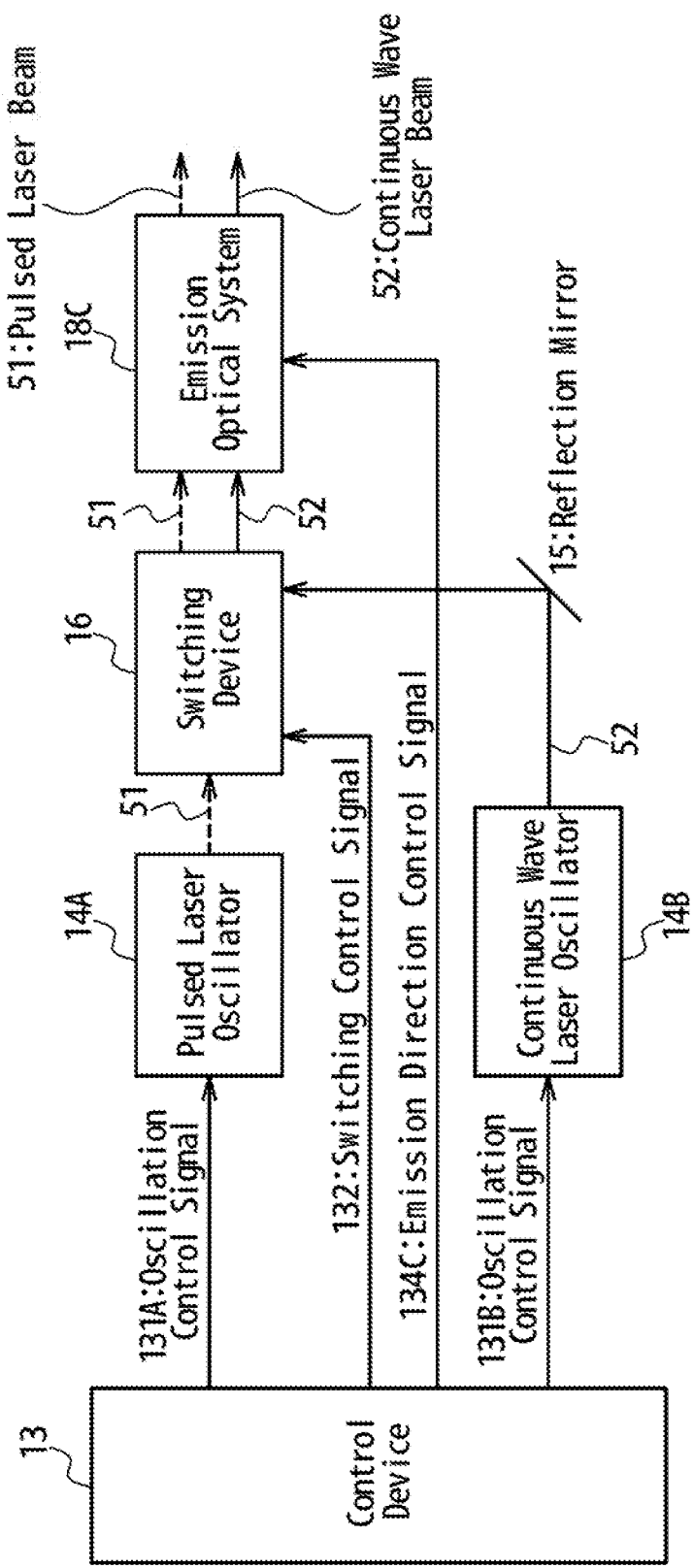
FIG. 7 is a block circuit diagram showing a second example of configuration of an underwater acoustic deception system according to a third embodiment.

In case of emitting pulsed laser beam 51 and continuous wave laser beam 52 one by one, as a second example of configuration of the underwater acoustic deception system 1 according to the present embodiment, the pulsed laser beam 51 and the continuous wave laser beam 52 may be oscillated by different oscillators, respectively, coaxialized by an auxiliary optical system or the like and then emitted by a common emission optical system 18. FIG. 7 is a block circuit diagram showing a second example of configuration of the underwater acoustic deception system 1 according to the third embodiment. The underwater acoustic deception system 1 in FIG. 7 is provided with a control device 13, a pulsed laser oscillator 14A, a continuous wave laser oscillator 14B, a reflection mirror 15 as an auxiliary optical system, a switching device 16 and an emission optical system 18C. The underwater acoustic deception system 1 in FIG. 7 has following difference compared to the case of the first embodiment shown in FIG. 3A. That is, the continuous wave laser oscillator 14B and the switching device 16 are added. Herein, the switching device 16 is desirably provided with two receiving ports, an emission port, a reflection mirror other than the reflection mirror 15 and a driving device for adjusting position or angle of this reflection mirror.

Configuration and connection relationship of the control device 13 and the pulsed laser oscillator 14A are similar to the case of the first embodiment and therefore further specific description thereof will be omitted. Configuration and connection relationship of the control device 13 and the continuous wave laser oscillator 14B are similar to the case of the second embodiment and therefore further specific description thereof will be omitted.

When paying attention to electrical connection relationship among other connection relationships of each component shown in FIG. 7, the switching device 16 and the emission optical system 18C are respectively connected to the control device 13. In addition, when paying attention to optical relationship, the switching device 16 is arranged to output of the pulsed laser oscillator 14A and the emission optical system 18C is arranged to output of the switching device 16. Furthermore, the switching device 16 is arranged to output of the continuous wave laser oscillator 14B via the reflection mirror 15 too. It should be noted that the reflection mirror 15 may be arranged between the pulsed laser oscillator 14A and the switching device 16.

Operations related to each component, the reflection mirror 15, the switching device 16 and the emission optical system 18C, of the second example of configuration of the third embodiment will be described.

A series of operations from generation of oscillation control signal 131A by the control device 13 to oscillation of pulsed laser beam 51 by the pulsed laser oscillator 14A is similar to the case in the first embodiment. In addition, a series of operations from generation of oscillation control signal 131B by the control device 13 to oscillation of continuous wave laser beam 52 by the continuous wave laser oscillator 14B is similar to the case in the second embodiment. The switching device 16 receives pulsed laser beam 51 at a first receiving port and receives continuous wave laser beam 52 at a second receiving port via the reflection mirror 15. Herein, the reflection mirror 15 guides continuous wave laser beam 52 from an emission port of the continuous wave laser oscillator 14B to the second receiving port of the switching device 16.

The control device 13 generates switching control signal 132 for controlling switching between pulsed laser beam 51 and continuous wave laser beam 52. The control device 13 transmits the generated switching control signal 132 to the switching device 16. The switching device 16 receives the transmitted switching control signal 132. The switching device 16 adjusts position, angle and the like of a reflection mirror provided thereto by driving device based on the received switching control signal 132. By doing so, the switching device 16 is able to switch a first state and a second state under control of the control device 13. That is, the switching device 16 in the first state selectively emits the pulsed laser beam 51 received at the first receiving port from the emission port. In addition, the switching device 16 in the second state selectively emits the continuous wave laser beam 52 received at the second receiving port from the emission port. The emission optical system 18C receives the selectively emitted pulsed laser beam 51 or continuous wave laser beam 52.

The control device 13 generates an emission direction control signal 134C for controlling the direction of emitting the laser beam 50 by the emission optical system 18C and controlling the position of focusing the laser beam 50. The control device 13 transmits the generated emission direction control signal 134C to the emission optical system 18C. The emission optical system 18C receives the transmitted emission direction control signal 134C. The emission optical system 18C adjusts the emission direction and the focusing position based on the received emission direction control signal 134C. The emission optical system 18C emits the received pulsed laser beam 51 or continuous wave laser beam 52 to the adjusted emission direction and so as to focus at the adjusted focusing position.

The control device 13 desirably generates and outputs the oscillation control signal 131A, the oscillation control signal 131B and the switching control signal 132 at appropriate timings, respectively, in response to the detection signal 121 received from the external system 12 that is not shown. Other operations of the underwater acoustic deception system 1 according to the second example of configuration of the present embodiment are similar to the cases of the first embodiment or the second embodiment and therefore further specific description thereof will be omitted.

(Third Example of Configuration of the Third Embodiment)

Figure 8:
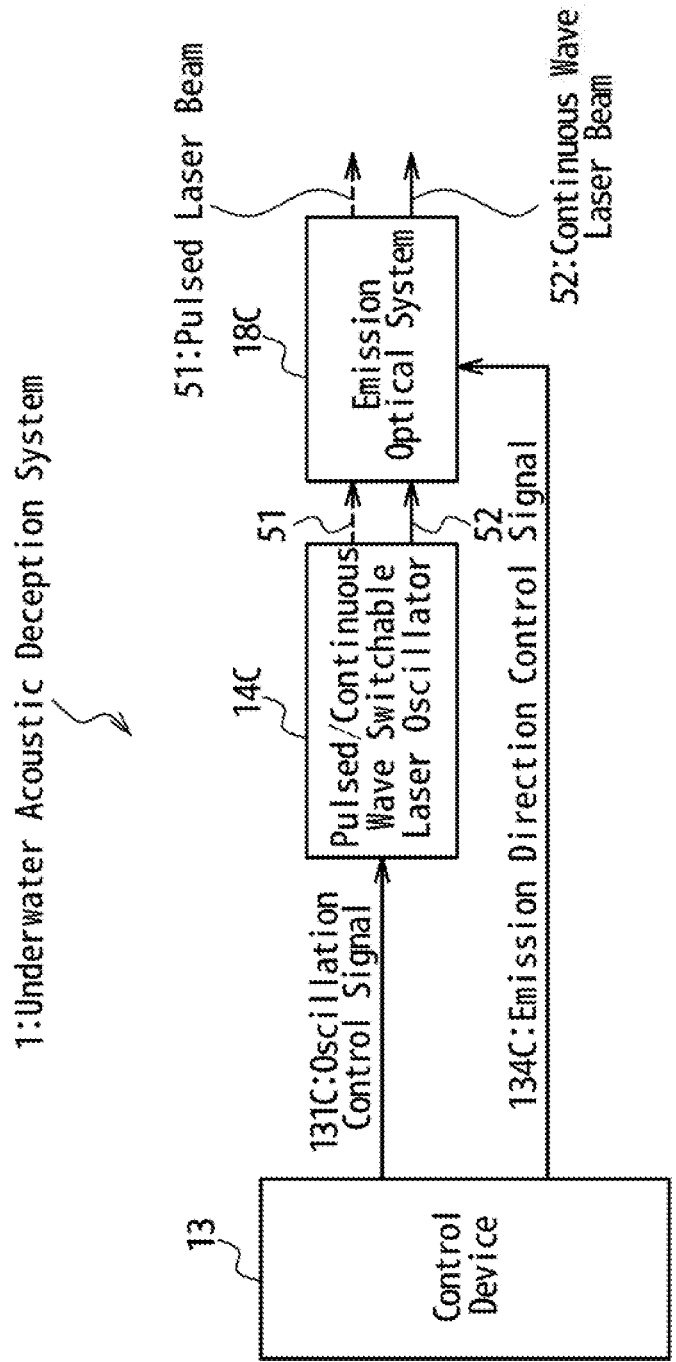
FIG. 8 is a block circuit diagram showing a third example of configuration of an underwater acoustic deception system according to a third embodiment.

In a case of emitting the pulsed laser beam 51 and the continuous wave laser beam 52 one by one, the pulsed laser beam 51 and the continuous wave laser beam 52 may be oscillated by a same oscillator and emitted by a same emission optical system 18, as a third example of configuration of the underwater acoustic deception system 1 according to the present embodiment. FIG. 8 is a block circuit diagram showing the third example of configuration of the underwater deception system 1 according to the third embodiment. The underwater acoustic deception system 1 in FIG. 8 is provided with a control device 13, a pulsed/continuous wave switchable laser oscillator 14C and an emission optical system 18C.

The pulsed/continuous wave switchable laser oscillator 14C has a first state and a second state that switch under control of the control device 13. That is, the pulsed/continuous wave switchable laser oscillator 14C oscillates pulsed laser beam 51 in the first state and oscillates continuous wave laser beam 52 in the second state.

More specifically, for example, a pulsing device such as so-called "Q switch" and a method of using this can be considered. That is, the pulsed/continuous wave switchable laser oscillator 14C in the first state is optically connected to a pulsing device and oscillates pulsed laser beam 51. The pulsed/continuous wave switchable laser oscillator 14C in the second state is optically disconnected from the pulsing device and oscillates continuous wave laser beam 52.

Connection relationship between each component shown in FIG. 8 will be described. When paying attention to electrical connection relationship, the pulsed/continuous wave switchable laser oscillator 14C and the emission optical system 18C are respectively connected to the control device 13. In addition, when paying attention to optical connection relationship, the emission optical system 18C is arranged to output of the pulsed/continuous wave switchable laser oscillator 14C.

Operations of the underwater acoustic deception system 1 shown in FIG. 8 will be described. The control device 13 generates oscillation control signal 131C for controlling oscillation of pulsed laser beam 51 or continuous wave laser beam 52 and switching thereof. The control device 13 transmits the generated oscillation control signal 131C to the pulse/continuous wave switchable laser oscillator 14C. The pulse/continuous wave switchable laser oscillator 14C receives the transmitted oscillation control signal 131C. The pulse/continuous wave switchable laser oscillator 14C selectively oscillates pulsed laser beam 51 or continuous wave laser beam 52 in response to the received oscillation control signal 131C. The pulsed/continuous wave switchable laser oscillator 14C emits the oscillated pulsed laser beam 51 or continuous wave laser beam 52 to the emission optical system 18C.

Operations from generation of emission direction control signal 134C by the control device 13 to emission of pulsed laser beam 51 or continuous wave laser beam 52 by the emission optical system 18C are similar to the case of the second example of configuration of the third embodiment shown in FIG. 7 and therefore further specific description thereof will be omitted.

(Fourth Example of Configuration of the Third Embodiment).

In case of simultaneously emitting pulsed laser beam 51 and continuous wave laser beam 52, as a fourth example of configuration of the underwater acoustic deception system 1 according to the present embodiment, the pulsed laser beam 51 and the continuous wave laser beam 52 may be oscillated by different oscillators, respectively, and may be emitted by different emission optical system 18, respectively. Block circuit diagram showing the fourth example of configuration of the underwater acoustic deception system 1 according to the third embodiment is identical to FIG. 6 showing the first example of configuration of the third embodiment and therefore will be omitted here. However, unlike the case of the first example of configuration, the underwater acoustic deception system 1 according to the present example of configuration is able to simultaneously emit pulse laser beam 51 and continuous wave laser beam 52. For this reason, in the present example of configuration, the control device 13 may simultaneously transmits the oscillation control signals 131A and 131B to the pulse laser oscillator 14A and the continuous wave laser oscillator 14B, respectively.

Other configurations and operations of the underwater acoustic deception system 1 according to the present example of configuration are similar to the first embodiment or the second embodiment and therefore further specific description will be omitted.

(Fifth Example of Configuration of the Third Embodiment)

Figure 9:
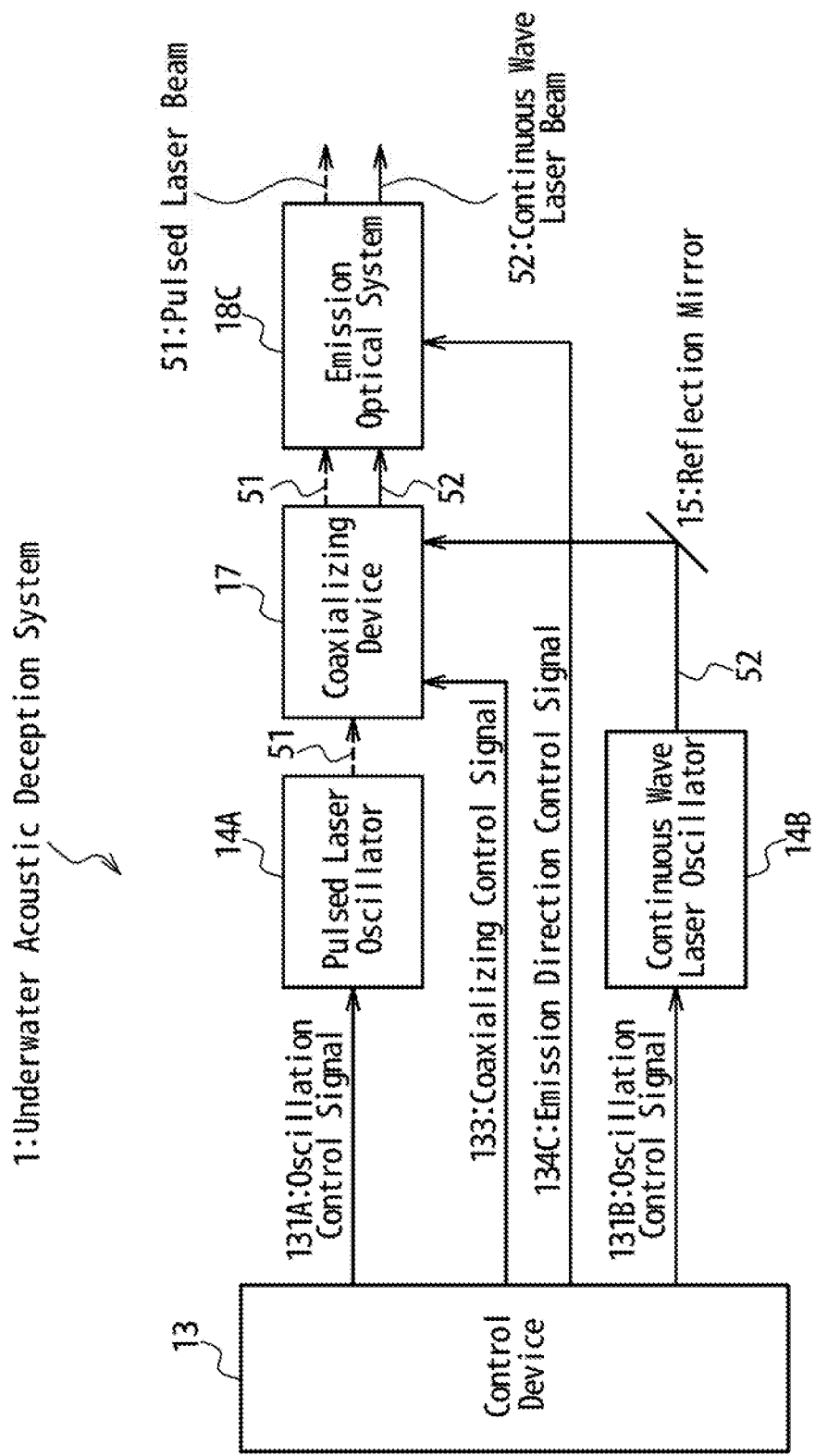
FIG. 9 is a block circuit diagram showing a fifth example of configuration of an underwater acoustic deception system according to a third embodiment.

In case of simultaneously emit pulsed laser beam 51 and continuous wave laser beam 52, as a fifth example of configuration of the underwater acoustic deception system 1 according to the present embodiment, the pulsed laser beam 51 and the continuous wave laser beam 52 may be oscillated by different oscillators, respectively, and may be emitted by a same single emission optical system 18. FIG. 9 is a block circuit diagram showing the fifth example of configuration of the underwater acoustic deception system 1 according to the third embodiment. The underwater acoustic deception system 1 in FIG. 9 has following difference compared to the second example of configuration of the present embodiment shown in FIG. 7. That is, the switching device 16 is replaced with coaxializing device 17. Herein, the coaxializing device 17 is desirably provided with two receiving ports and an emission port. The coaxializing device 17 coaxializes two laser beams respectively received at two receiving ports and emits them from the emission port.

Configuration and connection relationship of the control device 13 and the pulsed laser oscillator 14A are similar to the case of the first embodiment and therefore further specific description thereof will be omitted. Configuration and connection relationship of the control device 13 and the continuous wave laser oscillator 14B are similar to the case of the second embodiment and therefore further specific description thereof will be omitted.

Connection relationship of each component related to the coaxializing device 17 will be described. When paying attention to electrical connection relationship, the coaxializing device 17 is connected to the control device 13. In addition, when paying attention to optical connection relationship, a first receiving port of the coaxializing device 17 is arranged at output of the pulsed laser oscillator 14A. A second receiving port of the coaxializing device 17 is arranged at output of the continuous wave laser oscillator 14B via reflection mirror 15. The emission optical system 18C is arranged at output of the coaxializing device 17.

Operations related to the coaxializing device 17 of each component of the fifth example of configuration of the third embodiment will be described.

A series of operations from generation of oscillation control signal 131A by the control device 13 to oscillation of pulsed laser 51 by the pulsed laser oscillator 14A is similar to the case of the first embodiment. The pulsed laser oscillator 14A emits the oscillated pulsed laser beam 51 to the first receiving port of the coaxializing device 17. The coaxializing device 17 receives the emitted pulsed laser beam 51 at the first receiving port.

A series of operations from generation of the oscillation control signal 131B by the control device 13 to oscillation of continuous wave laser beam 52 by the continuous wave laser oscillator 14B are similar to the case of the second embodiment. The continuous wave laser oscillator 14B emits the oscillated continuous wave laser beam 52 to the second receiving port of the coaxializing device 17.

The control device 13 generates a coaxializing control signal 133 for controlling coaxialization of pulsed laser beam 51 and continuous wave laser beam 52. The control device 13 transmits the generated coaxializing control signal 133 to the coaxializing device 17. The coaxializing device 17 receives the transmitted coaxializing control signal 133. In addition, the coaxializing device 17 receives emitted pulsed laser beam 51 at the first receiving port. The coaxializing device 17 receives emitted continuous wave laser beam 52 at the second receiving port. Herein, the coaxializing device 17 adjusts an optical axis direction of the received pulsed laser beam 51 and an optical axis direction of the received continuous wave laser beam 52, respectively, in response to the received coaxializing control signal 133. As a result, the coaxializing device 17 coaxializes the received pulsed laser beam 51 and continuous wave laser beam 52 and emits them from the emission port of which optical axis direction is adjusted.

The control device 13 generates and outputs the oscillation control signal 131A, the oscillation control signal 131B and the coaxializing control signal 133 in response to the detection signal 121 received from the external system 12 that is not shown. Other operations of the underwater acoustic deception system 1 according to the fifth example of configuration of the third embodiment are similar to the case of the first embodiment or the second embodiment and therefore further specific description will be omitted.

As described above, the underwater acoustic deception system 1 and the underwater acoustic deception method according to the third embodiment enable achieving both advantages of the first embodiment and the second embodiment by switching or simultaneously emitting pulsed laser beam 51 and continuous wave laser beam 52.

Fourth Embodiment

In the fourth embodiment, a feedback control is added to the first to third embodiments. That is, a sound indicating that bubbles 70 are generated by emission of laser beam 50, or a silence indicating a failure on the contrary, are observed by use of observation device such as sonar, and a result thereof is fed backed to carry out an adjustment of the emission optical system 18. The underwater acoustic deception system 1 and the underwater acoustic deception method according to the present embodiment will be described with reference to FIGS. 10A and 10B.

Figure 10A:
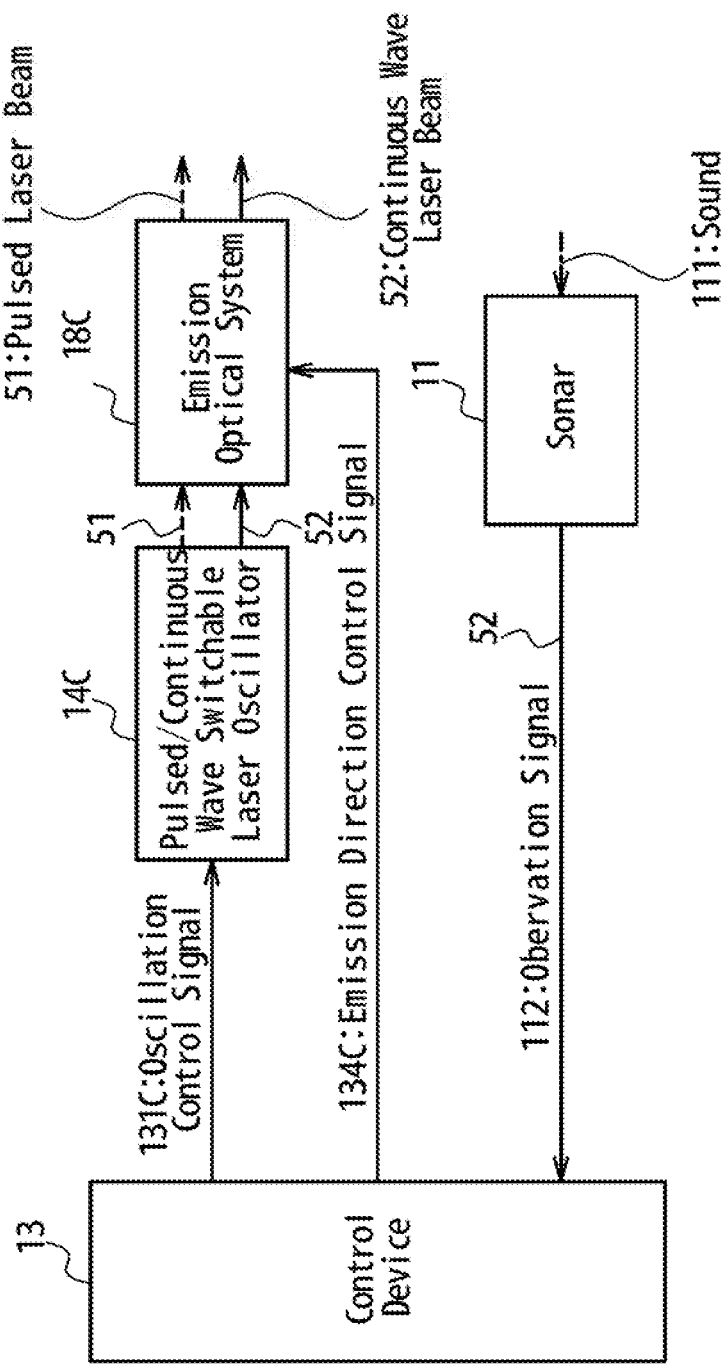
FIG. 10A is a block circuit diagram showing an example of configuration of an underwater acoustic deception system according to a fourth embodiment.

FIG. 10A is a block circuit diagram showing an example of configuration of the underwater acoustic deception system 1 according to the fourth embodiment. The underwater acoustic deception system 1 shown in FIG. 10A is, as an example, the third example of configuration of the third embodiment shown in FIG. 8 added with sonar 11. The sonar 11 is electrically connected to the control device 13. It should be noted that this sonar 11 may be a part of the external system 12 that is not shown.

Figure 10B:
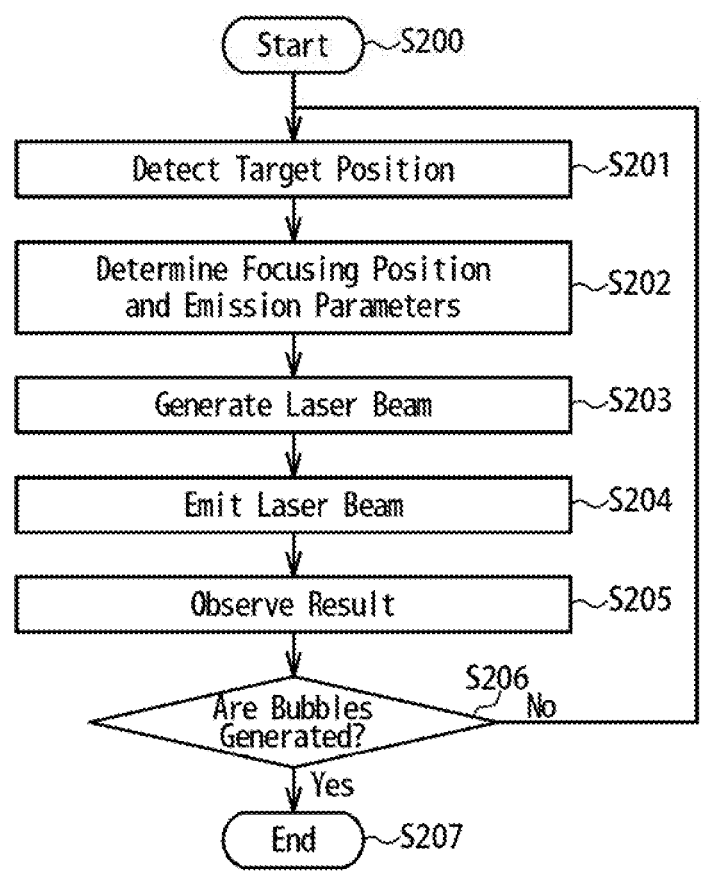
FIG. 10B is a flowchart showing an example of configuration of an underwater acoustic deception method according to a fourth embodiment.

Operations of the underwater acoustic deception system 1 according to the present embodiment, that is, the underwater acoustic deception method according to the present embodiment will be described. FIG. 10B is a flowchart showing an example of configuration of the underwater acoustic deception method according to the fourth embodiment. The flowchart in FIG. 10B includes a total of eight steps, from the 0-th step S200 to the seventh step S207. The flowchart in FIG. 10B starts by the 0-th step S200. The first step S201 is executed next to the 0-th step S200.

Hereinafter, each step of the flowchart in FIG. 10B will be described in comparison with each step of the flowchart in FIG. 3B. However, while the flowchart in FIG. 3B is based on the example of configuration in FIG. 3A, the flowchart in FIG. 10B is based on the example of configuration in FIG. 10A. Therefore, replacement of components will be carried out in the following description. That is, the oscillation control signal 131A in FIG. 3A will be replaced to the oscillation control signal 131C in FIG. 10A. The pulsed laser oscillator 14A in FIG. 3A will be replaced to the pulsed/continue wave switchable laser oscillator 14C in FIG. 10A. The pulsed laser beam 51 in FIG. 3A will be replaced to the pulsed laser beam 51 and/or continuous wave laser beam 52 in FIG. 10A. The emission optical system 18A in FIG. 3A will be replaced to the emission optical system 18C in FIG. 10A.

In the first step S201, the underwater acoustic deception system 1 detects a position of a target. Herein, the target indicates a submarine 30, a torpedo 40 or the like as an underwater threat. As a method of detecting a target, a sound 111 that satisfies predetermined conditions may be detected by sonar 11 or corresponding information may be received from outside. In case of detecting the sound 111 by the sonar 11, it is preferable to generate an observation signal 112 that indicates this fact and transmit it to the control device 13. In case of receiving information from outside, it is preferable that the control device 13 receives this information too. The second step S202 is executed next to the first step S201.

In the second step S202, the underwater acoustic deception system 1 determines the focusing position that is the target position to focus laser beam 50 and emission parameters of the laser beam 50. A content of the second step S202 in FIG. 10B is similar to the first step S101 in FIG. 3B and therefore further specific description will be omitted. The third step S203 is executed next to the second step S202.

In the third step S203, the underwater acoustic deception system 1 generates pulsed laser beam 51 based on the determined emission parameters. A content of the third step S203 in FIG. 10B is similar to the second step S102 in FIG. 3B and therefore further specific description will be omitted. The fourth step S204 will be executed next to the third step S203.

In the fourth step S204, the underwater acoustic deception system 1 emits laser beam 50 to the determined focusing position. A content of the fourth step S204 in FIG. 10B is similar to the third step S103 in FIG. 3B and therefore further specific description will be omitted. The fifth step S205 will be executed next to the fourth step S204.

In the fifth step S205, the underwater acoustic deception system 1 observes a result of emitting the laser beam 50, that is, whether bubbles 70 are generated in water or not. This observation is carried out by detecting sound 111 generated when bubbles 70 are generated by the sonar 11, by detecting a silence in case of no generation of bubble 70, or the like. In any case, the sonar 11 electrically converts the observation result to generate the observation signal 112 and transmits the generated observation signal 112 to the control device 13. The control device 13 receives transmitted observation signal 112 and carries out the above determination. The sixth step S206 is executed next to the fifth step S205.

In the sixth step S206, the underwater acoustic deception system 1 determines whether bubbles 70 are generated or not by the control device 13. In case of observing no generation of bubble 70 (NO), the first step S201 is executed again next to the sixth step S206 and the second step S202 is next executed again. At this time, it is preferable that the emission parameters and the focusing position are corrected so as to generate bubbles 70 more easily. On the contrary, in case of observing generation of bubbles 70 (YES), the seventh step S207 is executed next to the sixth step S206 and the flowchart in FIG. 10B ends.

According to the present embodiment, it is expected that bubbles 70 are generated by laser beam 50 with a higher accuracy. In addition, the sonar 11 may detect the position where bubbles 70 are generated, its range, loudness of popping sound, or the like. For example, the sonar 11 determines positional information of a range where acoustic effect occurs, based on information related to the bubbles 70. The control device 13 corrects the emission parameters and the focusing position based on the positional information. As a result, deception of the sensor by acoustic effect can be realized more reliably. In addition, the control device 13 may determine the positional information of the range where acoustic effect occurs based on information related to bubbles 70 detected by the sonar 11.

Fifth Embodiment

It will be described that sonar can be disabled by effectively selecting a position to generate bubble 70, with reference to FIGS. 11A and 11B.

Figure 11A:
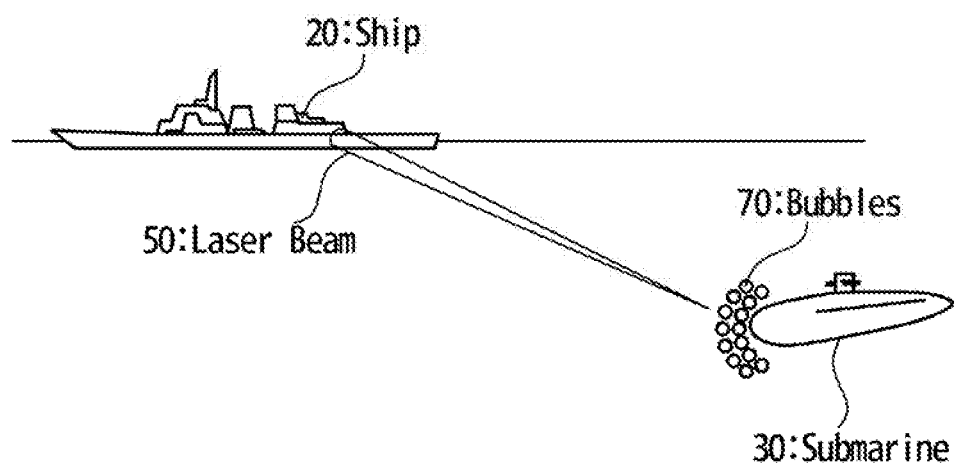
FIG. 11A is a diagram showing a first example of configuration of an underwater acoustic deception system according to a fifth embodiment.
Figure 11B:
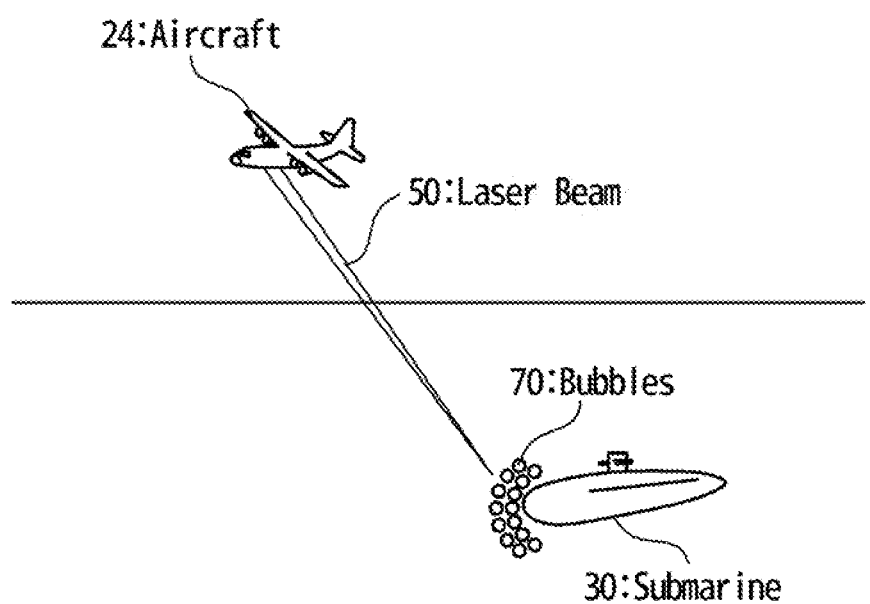
FIG. 11B is a diagram showing a second example of configuration of an underwater acoustic deception system according to a fifth embodiment.

FIG. 11A is a diagram showing a first example of configuration of the underwater acoustic deception system 1 according to the fifth embodiment. FIG. 11A is differs in following point compared to FIG. 4A. That is, the position where bubbles 70 are generated by laser beam 50 is in a region between the ship 20 as protection target and the submarine 30 as a threat in FIG. 4A, while it is in a vicinity of the submarine 30 in front thereof in FIG. 11A.

In the present embodiment, it is assumed that sonar is installed in a front part of the submarine 30 and the sonar is disabled by generating bubbles 70 in vicinity thereof. That is, operations of active sonar can be shut in by acoustic effect by bubbles 70 of reflecting sound waves such as pinger 91. In addition, output of passive sonar can be saturated by acoustic effect by bubbles 70 of generating sound wave.

As described above in relation with FIG. 4D, aircraft 24 is desirable as a platform to install underwater acoustic deception system 1 because of higher freedom in moving than ship 20, because of difficulty for a submarine 30 as a threat to deal with, or the like. FIG. 11B is a diagram showing a second example of configuration of the underwater acoustic deception system 1 according to the fifth embodiment. By installing the underwater acoustic deception system 1 according to the present embodiment on an aircraft 24 flying on water, effects similar to FIG. 11A can be obtained.

According to the present embodiment, by positively using the underwater acoustic deception system 1, ship 20 can be protected from underwater threat more reliably.

Sixth Embodiment

Figure 12:
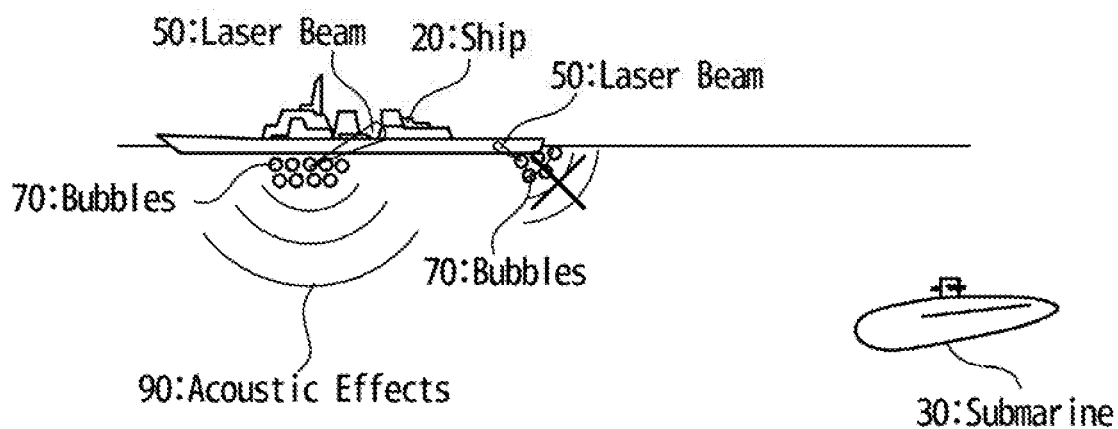
FIG. 12 is a diagram showing an example of configuration of an underwater acoustic deception system according to a sixth embodiment.

It will be described that a ship 20 as a protection target can be hidden from sonar of a submarine 30 as a threat or the like by effectively select a position to generate bubbles 70, with reference to FIG. 12. FIG. 12 is a diagram showing an example of configuration of the underwater acoustic deception system 1 according to the sixth embodiment.

FIG. 12 is different in following point compared to FIG. 4A. That is, the position of bubbles 70 generated by laser beam 50 is in a region between the ship 20 as a protection target and the submarine 30 as a threat in FIG. 4A, while it is in a vicinity of the ship 20, especially at rear part of the ship 20, that is in a vicinity of screws of the ship 20 in FIG. 12. In addition, the position of the bubbles 70 may be in a vicinity of a position where navigation sound of the ship 20 is generated.

As shown in FIG. 12, a navigation sound of a ship 20 can be blocked by bubbles 70, by generating bubbles 70 in a vicinity of the ship 20, and a sound generated by screw of a ship 20 can be blocked by bubbles 70, by generating the bubbles 70 in a vicinity of the screw. As a result, acoustic effect is expected in that the ship 20 becomes more difficult to detect by sonar installed to a submarine 30, a torpedo 40 or the like as a threat.

In addition, as shown in FIG. 12, by generating bubbles 70 in a vicinity of the ship 20, acoustic effect can be expected in that a shape of the ship 20 can be deceived even if the existence of the ship 20 is detected by sonar installed to a submarine 30, a torpedo 40 or the like as a threat.

Different acoustic effects can be obtained by changing focusing position of generating bubbles 70 in the present embodiment shown in FIG. 12, in the fifth embodiment shown in FIG. 11A and the first embodiment shown in FIG. 4A. Those embodiments can be simultaneously combined to obtain complex acoustic effect. However, it is desirable to emit laser beams 50 to each focusing position in order of longer distance from the underwater acoustic deception system 1 for example so that bubbles 70 generated earlier do not interfere laser beam 50 to be emitted later.

Seventh Embodiment

Figure 13:
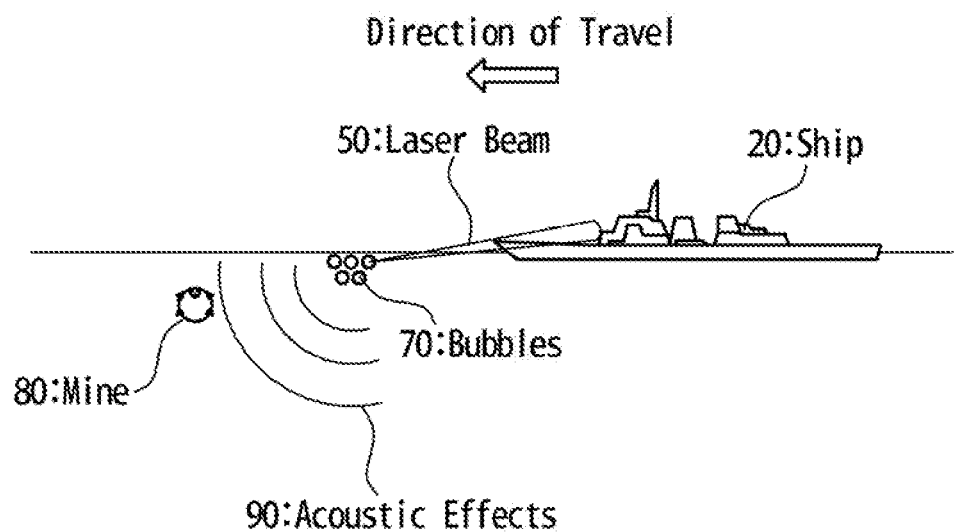
FIG. 13 is a diagram showing an example of configuration of an underwater acoustic deception system according to a seventh embodiment.

It will be described that acoustic effect of bubbles 70 can be applied to ocean minesweeping with reference to FIG. 13. FIG. 13 is a diagram showing an example of configuration of the underwater acoustic deception system 1 according to the seventh embodiment.

Conventionally, as described above, naval mines that can be removed have been the ones located behind a ship carrying out minesweeping. This is because minesweeping operation of removing naval mines that are installed is carried out in such a way that the ship or the like tows minesweeping equipment. As a result, there was a risk in that the ship is damaged by an ahead naval mine by detonating by navigation of itself.

In the present embodiment, the underwater acoustic deception system 1 generates many bubbles 70 in a sea area where naval mines are assumed to be laid, by focusing laser beams 50 such as pulsed laser beams 51 and high power continuous wave laser beam 52 in a region in travel direction of the ship 20 and in a given distance from the ship 20. By doing so, a region where bubbles 70 are distributed at a certain rate or more is made. The bubbles 70 thus distributed generate sound waves when deforming or bursting. Furthermore, acoustic effects of those sound waves consequently modify water pressure in surroundings. As a result, as shown in FIG. 13, it is possible to detonate naval mines in a region in front of the ship and with an enough distance from the ship 20, by making acoustic detection sensors and water pressure detection sensors installed to naval mines misidentify.

According to the present embodiment, sound mines and hydraulic mines installed in front of minesweeping ship can be removed and it is possible to suppress risk for minesweeping ship to be damaged by naval mines and wear and tear of minesweeping equipments.

Although the invention made by the inventor(s) has been described in detail above based on embodiments, it is needless to say that the present invention is not limited by the above described embodiment and that various modifications may be made without departing from the scope thereof. In addition, each feature described in the above embodiments can be freely combined as long as there is no technical contradiction. For example, the underwater acoustic deception system 1 can receive a detection signal 121 from an external device and the external system 12 can be omitted from the underwater acoustic deception system 1.

The present application claims priority based on Japanese Patent Application No. 2018-23980 filed on Feb. 14, 2018, and all disclosure thereof is incorporate herein.

The invention claimed is:

1. An underwater acoustic deception system, comprising:
   a control device configured to determine a focusing position to focus a laser beam in water in order to generate bubbles at a desired position with a desired scale and emission parameters of the laser beam;
   a laser oscillator configured to generate, under control of the control device, the laser beam configured to focus in the water and generate the bubbles;
   emission optical system configured to emit, under control of the control device, the generated laser beam to the focusing position; and
   a sonar configured to detect whether generation of the bubbles caused by the emitted laser beam has occurred or not,
   wherein the underwater acoustic deception system is configured to deceive an arbitrary sensor existing in the water by acoustic effect of the bubbles on the surroundings, and
   wherein the control device is further configured to carry out a feedback control of adjusting the emission parameters based on a result of detecting whether the generation has occurred or not.

2. The underwater acoustic deception system according to claim 1, wherein the control device is further configured to determine the emission parameters and the focusing position so as to deceive the sensor by reflecting a pinger emitted by the sensor by the bubbles before the pinger reaches a protection target.

3. The underwater acoustic deception system according to claim 1, wherein the control device is further configured to determine the emission parameters and the focusing position so as to deceive the sensor by a sound wave generated by deformation and bursting of the bubbles.

4. The underwater acoustic deception system according to claim 1, wherein the control device is further configured to determine the emission parameters and the focusing position so as to deceive the sensor by varying surround water pressure by the bubbles.

5. The underwater acoustic deception system according to claim 1, wherein the control device is further configured to determine the emission parameters and the focusing position based on a position of the sensor so as to disable the sensor.

6. The underwater acoustic deception system according to claim 1,
wherein the laser oscillator comprises a pulsed laser oscillator configured to oscillate a pulsed laser beam.

7. The underwater acoustic deception system according to claim 1, wherein the laser oscillator comprises a continuous wave laser oscillator configured to oscillate a continuous wave laser beam.

8. The underwater acoustic deception system according to claim 6, wherein the laser oscillator further comprises a continuous wave laser oscillator configured to oscillate a continuous wave laser beam.

9. The underwater acoustic deception system according to claim 1,
wherein the sonar is further configured to detect information of a range where the acoustic effect caused by the generated bubbles is effective; and
wherein the control device is further configured to carry out a feedback control of adjusting the focusing position based on the detected information.

10. An underwater acoustic deception method including:
determining a focusing position to focus a laser beam in water in order to generate bubbles at a desired position with a desired scale and emission parameters of the laser beam;
generating the laser beam configured to focus in the water and generate the bubbles;
emitting the generated laser beam to the focusing position; and
deceiving an arbitrary sensor existing in the water by acoustic effect of the bubbles on the surroundings;
detecting whether generation of the bubbles caused by the emitted laser beam has occurred or not; and
carrying out a feedback control of adjusting the emission parameters based on a result of detecting whether the generation has occurred or not.

11. The underwater acoustic deception method according to claim 10, wherein the determining the emission parameters and the focusing position is carried out so as to deceive the sensor by reflecting a pinger emitted by the sensor by the bubbles before the pinger reaches a protection target.

12. The underwater acoustic deception method according to claim 10, wherein the determining the emission parameters and the focusing position is carried out so as to deceive the sensor by a sound wave generated by deformation and bursting of the bubbles.

13. The underwater acoustic deception method according to claim 10, wherein the determining the emitting parameters and the focusing position so as to deceive the sensor by varying surround water pressure by the bubbles.

14. The underwater acoustic deception method according to claim 10, wherein the determining the emission parameters and the focusing position based on a position of the sensor so as to disable the sensor.

15. The underwater acoustic deception method according to claim 10, further including:
further detecting position information of a range where the acoustic effect caused by the generated bubbles is effective; and
further carrying out a feedback control of adjusting the focusing position based on a result of the detecting.

* * * * *